United States Patent Office 3,445,509
Patented May 20, 1969

3,445,509
PROCESS FOR THE MANUFACTURE OF ACETOACETIC ESTERS
Otto Probst and Lothar Hornig, Frankfurt am Main, Lothar Hirsch, Kelkheim, Taunus, and Helmut Gosse, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 22, 1965, Ser. No. 466,097
Claims priority, application Germany, June 26, 1964,
F 43,267
Int. Cl. C07c 69/72, 143/84; C07f 9/50
U.S. Cl. 260—479           9 Claims

ABSTRACT OF THE DISCLOSURE

Improved process for making acetoacetic acid esters by reacting diketene and a compound having an esterifiable hydroxy group, wherein a tertiary phosphine and/or betaine catalyst is employed.

The present invention relates to a process for the manufacture of acetoacetic esters.

It is known that alcohols and phenols can be reacted with diketene to obtain the corresponding acetoacetic esters. As catalysts for this reaction there may be used anhydrous acids such as sulfuric acid or benzenesulfonic acid, or basic substances such as tertiary amines, alkali metal acetates, or other substances having an alkaline reaction in aqueous solution.

Now we have found that tertiary phosphines and/or betaines, that is substances having a neutral reaction in aqueous solution, are suitable catalysts for the reaction between diketene and a compound containing at least one hydroxylic group, for example an alcohol or a phenol. As such catalysts it is particularly advantageous to use in accordance with the invention, tertiary phosphines (I), carboxylic acid betaines (II) or sulfonic acid betaines (III). Other betaines, for exaple sulfamic acid betaines (IV), may, however, also be used.

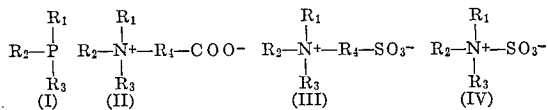

In the above Formulae I–IV, $R_1$, $R_2$ and $R_3$ may represent identical or different alkyl radicals, for example, methyl, ethyl or stearyl radicals, cycloalkyl radicals, for example cyclohexyl radicals, aralkyl radicals, for example benzyl radicals, or aryl radicals, for example phenyl or tolyl radicals. $R_1$, $R_2$ and $R_3$ may be olefinically unsaturated, that is they may be an alkenyl radical, for example, an allyl or oleyl radical. In Formulae II to IV, $R_4$ represents an alkylene radical, for example, the methylene or ethylene radical or a straight-chain or branched polymethylene radical or an arylene radical, for example, the phenylene, toluylene or diphenylene radical.

When $R_1$, $R_2$ and $R_3$ are aryl radicals and $R_4$ is an arylene radical, they do not, generally, contain an aromatic nucleus in which more than two benzene nuclei have been condensed. They may carry substituents that are inert towards the reaction, that is substituents that do not react with the reactants, particularly the diketene, under the reaction conditions. As such substituents, chlorine atoms may, for example, be mentioned. When $R_4$ is a polymethylene or diphenylene group, it may be interrupted by members that are inert towards the reaction, for example, oxygen atoms or an azo group. For example, $R_4$ may be a polyoxymethylene radical whose oxygen atoms are linked to carbon atoms or it may be the azophenylene group $-C_6H_4-N=N-C_6H_4-$.

Among the phosphines of the above Formula I, triarylphosphines are advantageously used, for example, tri-p-tolylphosphine, p-ethylphenyl-diphenylphosphine and preferably triphenylphosphine.

The catalyst is advantageously used in an amount within the range of 0.05 to 10%, preferably 0.1 to 5%, calculated on the weight of the compound containing at least one hydroxyl group, for example, the alcohol or phenol used. It is also possible to use mixtures of the above catalysts.

As alcohols or phenols, all compounds capable of forming esters may be used, for example, aliphatic or cycloaliphatic saturated or unsaturated mono- or polyhydric alcohols, phenol, polyhydric phenols and enols. For the reaction with diketene it is also possible to use oligomeric or polymeric compounds containing hydroxyl groups, for example, polyesters containing hydroxyl groups or carbohydrates.

The process of the invention is advantageously carried out in a manner such that the compound containing at least one hydroxyl group, for example, an alcohol or phenol, in admixture with the catalyst, is placed in the reaction vessel and the diketene is then run in. It is also possible, however, to introduce the components simultaneously into the reaction zone. If low molecular weight alcohols or phenols are used, it is advantageous to control the strongly exothermic reaction by eliminating the heat of reaction in an appropriate manner. In the case of high molecular weight alcohols, the reaction is advantageously facilitated by heating. When carrying out the process of the invention on an industrial scale, room temperature, i.e. about 20° C., or moderately elevated temperatures of up to 120° C. are generally used. The temperature should not be so high that the yield is considerably reduced by partial thermal decomposition of the desired acetoacetic ester.

The process of the invention may also be carried out in the presence of an inert solvent or diluent. Exemplary of such diluents or solvents are ethers such as dibutyl ether, tetrahydrofurane and dioxane, ketones such as acetone, methylethylketone and cyclohexanone, and acetic acid esters such as methyl or ethyl acetate.

When betaines, sulfonic acid betaines, or sulfamic acid betaines are used, it is advantageous to add a small amount, for example, 0.5 to 10%, calculated on the weight of the compound containing at least one hydroxyl group, of acetic acid or acetic anhydride to the reaction mixture containing the catalyst. When a diketene containing acetic acid or acetic anhydride is used, such addition can be dispensed with.

The catalysts to be used in accordance with the invention enable higher yields of acetoacetic ester to be obtained than with the use of the known acids or basic salts. Since the catalysts are neutral substances, they do not decompose the acetoacetic ester formed, which facilitates processing. Particularly in the manufacture of acetoacetic esters of high molecular weight mono- or polyhydric alcohols or of high molecular weight polyglycols which cannot be distilled or can be distilled only with difficulty, no distillation is required before processing, since the products remain colorless even when standing for a prolonged time. In contradistinction thereto, products obtained with the use of tertiary amines as catalysts always acquire a brown color.

The following examples serve to illustrate the invention but they are not intended to limit it thereto.

EXAMPLE 1

In a flask provided with a stirrer and a reflux condenser, a mixture of 100 grams of methanol and 1 gram of triphenylphosphine was heated to the boil. 250 grams of diketene were then added dropwise without heating, the mixture boiling on its own record. By subsequent distillation under a pressure of 30 millimeters of mercury, 302 grams (=87.5% of the theoretical) of acetoacetic acid methyl ester were obtained. The residue amounted to 20 grams (=5.7%).

EXAMPLE 2

In the apparatus described in Example 1, mixture of 100 grams of methanol and 1 gram of trimethylaminoacetic acid betaine was heated to a gentle boil. 250 grams of diketene containing about 5% of acetic anhydride were then added dropwise. By distillation under a pressure of 30 millimeters of mercury, 321 grams (=93.0% of the theoretical) of acetoacetic acid methyl ester and 6 grams (=1.7%) of residue were obtained.

EXAMPLE 3

Into a 20-liter vessel provided with a stirrer and heating means 10 kilograms of a linear polyester of a molecular weight of 2100 which had been obtained by esterification of adipic acid with diethylene glycol and contained two free hydroxyl groups per molecule, and 25 grams of triphenylphosphine were introduced. The mixture was heated to 50° C. and 900 grams of diketene were continuously added while stirring. When the reaction was complete, the slight excess of diketene was removed from the reaction mixture by applying a strongly reduced pressure of 0.2 millimeter of mercury. The conversion of the alcoholic groups was complete. The reaction product so obtained was clear and colorless and remained unchanged even when standing for a prolonged time.

EXAMPLE 4

In a 2-liter four-necked flask, 1 kilogram of a branched polyester having a molecular weight of 2200 which had been obtained from adipic acid, diethylene glycol and a triol, for example glycerol, and contained two free hydroxyl groups per molecule, 3 grams of trimethylaminoacetic acid betaine and 7 cc. of glacial acetic acid were heated to 50° C. 120 grams of diketene were then added dropwise while stirring. When the reaction was complete, the diketene in excess and acetic acid were removed as described in Example 3. The conversion of the free alcohol groups was complete. The reaction product so obtained was colorless and did not undergo discoloration even when standing for a prolonged time.

EXAMPLE 5

A mixture of 188 grams of phenol, 2 grams of trimethylaminoacetic acid betaine and 12 grams of glacial acetic acid was heated to 80° C. and 165 grams of diketene were added dropwise. The diketene was reacted completely. By subsequent distillation, 251 grams of a fraction boiling at a temperature within the range of 95 to 135° C. under a pressure of 7 millimeters of mercury and consisting substantially of acetoacetic acid phenyl ester were obtained in addition to a small excess amount of phenol.

EXAMPLE 6

In a flask provided with a stirrer and a reflux condenser a mixture of 100 grams of methanol, 0.5 gram of trimethylsulfamic acid betaine and 3 grams of glacial acetic acid was heated to the boil and 250 grams of diketene were then slowly added dropwise. By subsequent distillation under a pressure of 30 millimeters of mercury, 323 grams (=92.4% of the theoretical) of acetoacetic acid methyl ester and 9 grams (=2.5%) of residue were obtained.

We claim:

1. In a process for making acetoacetic esters by reacting diketene and a compound having an esterifiable hydroxy group, the improvement wherein said process is carried out at a temperature of from 20° C. to 120° C. in the presence of 0.5 percent to 10 percent of a catalyst selected from the group consisting of triaryl phosphines, trialkyl carboxylic acid betaines, and trialkyl sulfamic acid betaines of the formulae

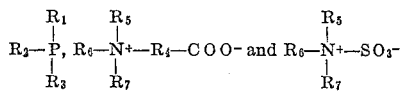

respectively, wherein $R_1$, $R_2$ and $R_3$ are aryl, $R_4$ is alkylene and $R_5$, $R_6$ and $R_7$ are alkyl.

2. The process of claim 1 wherein the reaction is carried out in the presence of 0.1 to 5% of said catalyst.

3. The process of claim 1 wherein said compound containing at least one hydroxyl group is methanol.

4. The process of claim 1 wherein said compound containing at least one hydroxyl group is phenol.

5. The process of claim 1 wherein said compound containing at least one hydroxyl group is a linear polyester of a molecular weight of 2100 which has been obtained by esterification of adipic acid with diethylene glycol and contains two hydroxyl groups per molecule.

6. The process of claim 1 wherein triphenylphosphine is used as catalyst.

7. The process of claim 1 wherein trimethylaminoacetic acid betaine is used as catalyst.

8. The process of claim 1 wherein trimethylsulfamic acid betaine is used as catalyst.

9. The process of claim 1 wherein the reaction is carried out in the presence of an inert solvent.

References Cited

UNITED STATES PATENTS 2,351,366   6/1944   Pohl et al. _____ 260—479

LORRAINE A. WEINBERGER, Primary Examiner.

M. G. BERGER, Assistant Examiner.

U.S. Cl. X.R.

260—483